(12) United States Patent
Thomas et al.

(10) Patent No.: US 10,233,764 B2
(45) Date of Patent: Mar. 19, 2019

(54) FABRIC SEAL AND ASSEMBLY FOR GAS TURBINE ENGINE

(71) Applicants: Rolls-Royce North American Technologies, Inc., Indianapolis, IN (US); Rolls-Royce Corporation, Indianapolis, IN (US)

(72) Inventors: David J. Thomas, Brownsburg, IN (US); Richard C. Uskert, Timonium, MD (US); Thomas D. Nixon, Brownsburg, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 624 days.

(21) Appl. No.: 14/880,660

(22) Filed: Oct. 12, 2015

(65) Prior Publication Data
US 2017/0101880 A1     Apr. 13, 2017

(51) Int. Cl.
*F01D 11/00* (2006.01)
*F01D 9/04* (2006.01)
*F16J 15/02* (2006.01)

(52) U.S. Cl.
CPC ............ *F01D 11/005* (2013.01); *F01D 9/042* (2013.01); *F05D 2240/55* (2013.01); *F05D 2300/6012* (2013.01); *F05D 2300/6033* (2013.01); *F05D 2300/6034* (2013.01); *Y02T 50/672* (2013.01)

(58) Field of Classification Search
CPC . F01D 9/04; F01D 9/041; F01D 9/042; F01D 11/005; F05D 2240/55; F05D 2240/56; F05D 2240/57; F05D 2300/6012; F05D 2300/6033; F05D 2300/6034; F16J 15/02; F16J 15/021; F16J 15/022; F16J 15/024; F16J 15/025; F16J 15/028
See application file for complete search history.

(56) References Cited

U.S. PATENT DOCUMENTS

| | | | | |
|---|---|---|---|---|
| 4,415,309 A | * | 11/1983 | Atterbury | ............ F16J 15/3288 277/355 |
| 4,989,886 A | | 2/1991 | Rulis | |
| 5,114,159 A | | 5/1992 | Baird et al. | |
| 5,358,262 A | * | 10/1994 | Roberts | ................ F16J 15/0812 277/652 |
| 5,622,474 A | | 4/1997 | Werner et al. | |
| 5,628,622 A | | 5/1997 | Thore et al. | |
| 5,630,700 A | * | 5/1997 | Olsen | ...................... F01D 5/189 415/134 |
| 5,657,998 A | | 8/1997 | Dinc et al. | |
| 5,678,898 A | | 10/1997 | Bagepalli et al. | |
| 5,915,697 A | | 6/1999 | Bagepalli et al. | |
| 6,173,958 B1 | | 1/2001 | Dinc et al. | |
| 6,471,472 B1 | * | 10/2002 | Stauder | ................... F01D 11/00 415/119 |

(Continued)

*Primary Examiner* — Richard A Edgar
*Assistant Examiner* — Alexander A White
(74) *Attorney, Agent, or Firm* — Barnes & Thornburg LLP

(57) ABSTRACT

A vane assembly for a gas turbine engine is disclosed in this paper. The vane assembly includes an inner platform, an outer platform, and a ceramic-containing airfoil. The ceramic-containing airfoil extends from the inner platform to the outer platform. A clamp mechanism couples the inner platform and the outer platform to the ceramic-containing airfoil.

20 Claims, 5 Drawing Sheets

(56) References Cited

U.S. PATENT DOCUMENTS

| | | |
|---|---|---|
| 6,652,231 B2 | 11/2003 | Vedantam et al. |
| 7,052,234 B2 * | 5/2006 | Wells ............... F01D 9/042 415/137 |
| 7,497,443 B1 | 3/2009 | Steinetz et al. |
| 7,600,970 B2 | 10/2009 | Bhate et al. |
| 8,251,652 B2 | 8/2012 | Campbell et al. |
| 8,678,754 B2 | 3/2014 | Morgan et al. |
| 2010/0327535 A1 | 12/2010 | Grace et al. |
| 2015/0003963 A1 | 1/2015 | Taketa et al. |

* cited by examiner

FABRIC SEAL AND ASSEMBLY FOR GAS TURBINE ENGINE

GOVERNMENT RIGHTS

The present application was made with the United States government support under Contract No. FA8650-07-C-2803, awarded by the U.S. government. The U.S. government may have certain rights in the presently disclosed inventions.

FIELD OF THE DISCLOSURE

The present disclosure relates generally to seals for gas turbine engines. More specifically, the present disclosure relates to seals adopted for use with ceramic matric composite components (CMGs) used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction that are directed into the turbine flow over airfoils included in stationary vanes and over rotating blades of the turbine. The interaction of combustion products with the airfoils heats the airfoils to temperatures that can require the airfoils to be made from high temperature materials such as ceramic matrix composite materials. Design and manufacture of vanes and blades from materials suitable for such conditions presents challenges relating to sealing between components.

SUMMARY

The present disclosure may comprise one or more of the following features and combinations thereof.

According to one aspect of the present disclosure, a fabric seal for sealing between components of a gas turbine engine is taught. The fabric seal may include a number of free tows each having a length and extending to a free end and a number of cross tows each extending across the length of the free tows and woven together therewith.

In some embodiments, the fabric seal may define a seal aperture. The free ends of the free tows may terminate within the seal aperture to provide a fringe and may be configured for compliant contact with a component of a gas turbine engine inserted into the seal aperture to provide fluid sealing around the component.

In some embodiments, the fringe may define a negative airfoil shape. The cross tows may extend along the profile of the negative airfoil shape and the free tows may extend inwardly towards the aperture. The fabric seal may comprise ceramic fibers.

In some embodiments, a plurality of the free tows and a plurality of the cross tows may be woven together into a first sheet. Another plurality of the free tows and another plurality of the cross tows may be woven together into a second sheet. The first and second sheets may be configured in a stacked arrangement. The seal aperture may be defined through each of the first and second sheets.

In some embodiments, each free end of the free tows may define a loop. The loop may be located within the aperture.

According to another aspect of the present disclosure, an assembly adapted for user in a gas turbine engine is taught. The assembly may include a first component defining a receiving space, a second component comprising ceramic matrix materials and arranged to extend into the receiving space, and a fabric seal.

In some embodiments, the fabric seal may define a seal aperture and may have tows that extend into the seal aperture. The tows may each include a free end. The second component may be arranged to extend through the seal aperture and may contact the free ends of the tows of the fabric seal to seal against fluid passing between the first and second components.

In some embodiments, the second component may be an airfoil vane of the gas turbine engine. The fringe may define a negative airfoil shape smaller than a cross-section of the airfoil vane.

In some embodiments, the first component may be an inner band of the gas turbine engine and the receiving space may be configured to receive the airfoil vane for connection to the inner band. The airfoil vane may include a vane body for contacting combustion exhaust gases and a connection protrusion that extends into the receiving space of the first component, the vane body having a radially inward face. The fabric seal may abut the radially inward face of the vane body and the fringe of the fabric seal may contact an outer surface of the connection protrusion.

In some embodiments, the airfoil vane may include an inner spar and an outer shell disposed on the inner spar for contacting combustion exhaust gases. A radially inward end of the airfoil vane including a portion of both the inner spar and the outer shell may be inserted into the receiving space of the first component. The fringe of the fabric seal may be disposed in contact with the portion of the outer shell inserted into the receiving space.

In some embodiments, the first turbine component may be an outer band including a receptacle configured to receive the airfoil vane. The airfoil vane may include an inner spar and an outer shell disposed on the inner spar for contacting combustion exhaust gases. A radially outward end of the airfoil vane including a portion of both the inner spar and the outer shell may be inserted into the receptacle. The fringe of the fabric seal may be disposed in contact with the portion of the outer shell inserted into the receptacle. The outer fabric seal may contact a biasing member to provide resilient biasing of the fabric seal.

In some embodiments, tows of the fabric seal are free tows and the fabric seal includes a plurality of the cross tows. A plurality of the free tows and a plurality of the cross tows may be woven together into a first sheet. Another plurality of the free tows and another plurality of the cross tows may be woven together into a second sheet. The first and second sheets may be arranged in a stacked arrangement and the seal aperture is defined through each of the first and second sheets. In some embodiments, each free end of the tows may define a loop.

According to another aspect of the present disclosure, a method of sealing components of a gas turbine engine is disclosed. The method may include positioning a fabric seal including a number of tows each having free ends arranged within a seal aperture defined by the fabric seal such that the fabric seal is in contact with a first component of the gas turbine engine, positioning a second component of the gas turbine component in contact with the free ends of the fabric seal, and driving the second component through the seal aperture into an operable position such that at least one of the tows of the fabric seal is distorted at its free end to maintain contact with the second component to provide fluid sealing. In some embodiments, the second turbine component may be an airfoil vane of the gas turbine engine.

These and other features of the present disclosure will become more apparent from the following description of the illustrative embodiments.

DETAILED DESCRIPTION OF THE DRAWINGS

Figure 1:
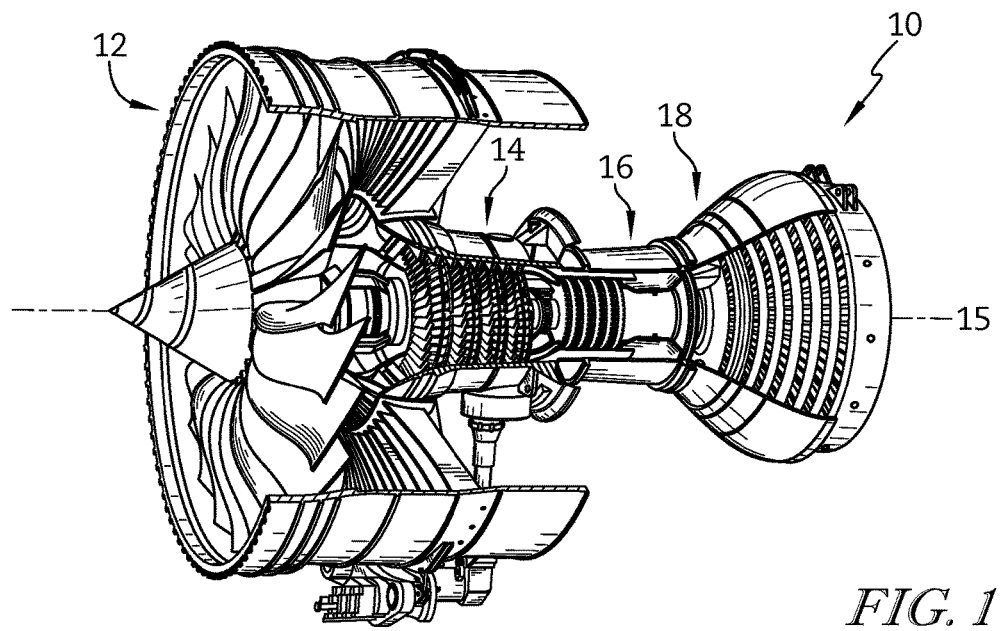
FIG. 1 is a perspective view of a gas turbine engine having a portion cut away to show that a turbine assembly is arranged to receive hot, high pressure combustion products from a combustor.

For the purposes of promoting an understanding of the principles of the disclosure, reference will now be made to a number of illustrative embodiments illustrated in the drawings and specific language will be used to describe the same.

An illustrative gas turbine engine 10 is cut-away in FIG. 1 to show that the engine 10 includes a fan 12, a compressor 14, a combustor 16, and a turbine 18. The fan 12 is driven by the turbine 18 and illustratively provides thrust for propelling an air vehicle (not shown). The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 15 and drive the compressor 14 and the fan 12.

Figure 2:
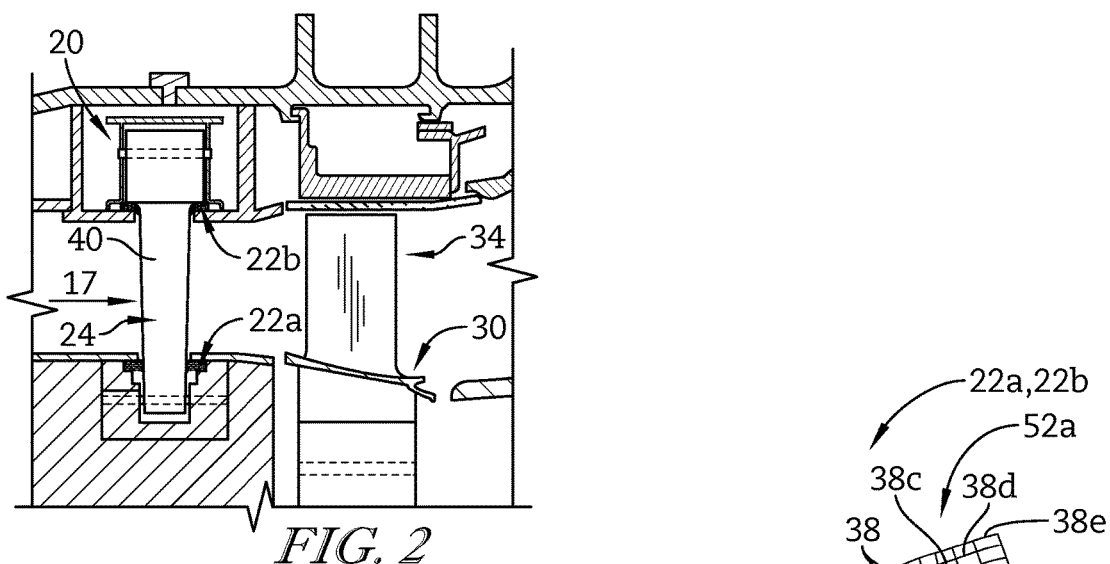
FIG. 2 is a cross-sectional view of the portion of the turbine assembly noted in FIG. 1 showing that the turbine assembly includes a vane assembly having fabric seals arranged between various turbine engine components, the components including a static airfoil vane made from ceramic matrix composite that redirects hot, high pressure combustion products, and showing that the fabric seals are positioned between the airfoil vane and other turbine components to provide sealing against leakage of the combustion products.

A cross-section of a portion of the turbine 18 shows that the turbine 18 includes a vane assembly 20 including fabric seals 22a, 22b configured to seal combustion products from passing between static vanes 24 and other turbine components, for example, an inner band 26 and an outer band 28. Turbine 18 includes the static vanes 24 and a turbine wheel assembly 30 as shown in FIG. 2. Static vanes 24 are illustratively airfoil vanes and extend across the flow path 17 of the hot, high-pressure combustion products from the combustor 16 to direct the combustion products toward blades 34 of the turbine wheel assembly 30. Blades 34 are in turn pushed by the combustion products to cause the turbine wheel assembly 30 to rotate; thereby, driving the rotating components of the compressor 14 and the fan 12. Static vanes 24 are illustratively arranged circumferentially adjacent to one another around inner band 26 to form a ring that extends around the axis 15.

In order to withstand the temperatures applied by the hot, high-pressure combustion products from the combustor 16, vane 24 illustratively includes an outer shell 40 illustratively comprised of ceramic-containing material as shown in FIG. 2. Ceramic-containing materials, like that of outer shell 40 of vane 24, are adapted to withstand very high operating temperatures that might not be possible for other materials, such as metallics. In the illustrative embodiment, outer shell 40 is illustratively made from a ceramic matrix composite (CMC). In some embodiments, outer shell 40 is made from a SiC-SiC ceramic matrix composite including a silicon carbide matrix and silicon carbide fibers. A ceramic-containing material includes any monolithic ceramic and or composite in which at least one constituent is a ceramic.

Figure 3:
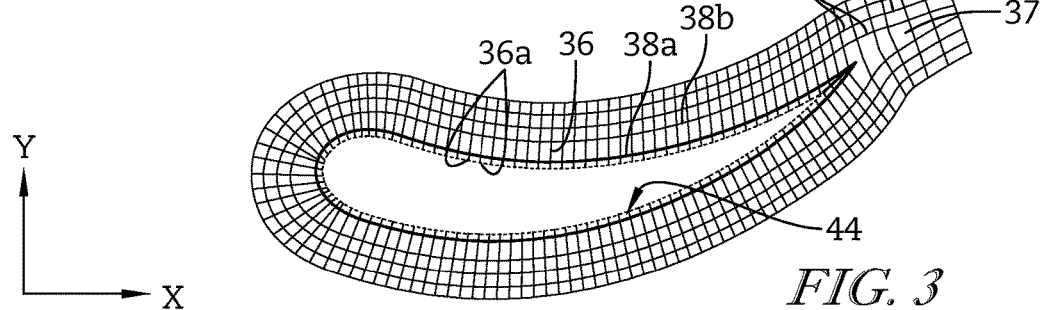
FIG. 3 is a top plan view of one of the fabric seals of FIG. 2 showing that each fabric seal of the fabric seal assembly defines a seal aperture and includes a number of fiber tows that include free tows extending into the seal aperture to define a seal fringe and cross tows extending across and woven with the free tows, and showing that the seal aperture and the fringe each have a negative airfoil shape corresponding to the cross-section of the airfoil vane.

As shown in the illustrative embodiment of FIG. 2, vane assembly 20 includes radially outer fabric seal 22b and radially inner fabric seal 22a each being disposed between components of the turbine 18 to seal combustion products from leaking between those components. Fabric seals 22a, 22b illustratively comprise temperature-resistant fibers that are not suspended in matrix material. Fabric seals 22a, 22 each illustratively define a seal aperture 32 as shown in FIG. 3. In the illustrative embodiment, seal aperture 32 of each fabric seal 22a, 22b receives a portion of static vane 24 therethrough.

Inner and outer fabric seals 22a, 22b each include fabric tows 36, 38 as shown in FIG. 3. Fabric tows 36, 38 include free tows 36 and cross tows 38. In the illustrative embodiment, free tows 36 of each fabric seal 22a, 22b illustratively extend inwardly towards its aperture 32. Additional fabric tows 37 illustratively extend in similar direction to free tows 36 in the same area, and generally perpendicular to cross tows 38, to complete fabric seal geometry. Cross tows 38 illustratively extend across free tows 36.

In the illustrative embodiment, cross tows 38 of each fabric seal 22a, 22b extend along an airfoil-shaped path as shown in the plan view of FIG. 3. Innermost cross tows 38a of each fabric seal 22a, 22b define an outmost edge of its aperture 32. As shown in FIG. 3, cross tows 38 are illustratively arranged in spaced apart relation to each other and are woven together with the free tows 36.

Free tows 36 of each fabric seal 22a, 22b illustratively extend across innermost cross tow 38a of the same fabric seal 22a, 22b and each terminate at a free end 36a within it aperture 32. Free ends 36a of the same fabric seal 22a, 22b are illustratively embodied as unrestricted ends that collectively form a portion of fringe 42 that is configured for relatively compliant contact with turbine components to provide sealing.

Each fringe 42 of fabric seals 22a, 22b illustratively defines a negative-airfoil shape (indicated by dotted line 44) that has corresponding contours to that of airfoil static vane 24 (indicated by 43) but has slightly smaller dimensions in the x and y directions as indicated in FIG. 3 than static vane 24 along the region of static vane 24 which the fabric seal 22a, 22b contacts. In the illustrative embodiment, innermost cross tows 38a have similar contours to that of airfoil static vane 24 but has slightly larger dimensions in the x and y directions indicated in FIG. 3 than static vane 24 along the region of static vane 24 which the fabric seal 22a, 22b contacts.

As shown in FIGS. 3, a plurality of free tows 36 and a plurality of cross tows 38a, 38b, 38c, 38d, and 38e are generally arranged in a first plane, defined by directional axes x and y as indicated therein. The plurality of free tows 36 and cross tows 38a-38e are woven together to form a sheet 52a. Each fabric seal 22a, 22b illustratively includes a plurality of sheets 52a, 52b, 52c, 52d, 52e. In some embodiments, the number of sheets is customizable based on one or more considerations, for example, dimensions, dimensional tolerances, materials of construction of the seal and turbine components, and operating conditions, etc.

Figure 4:
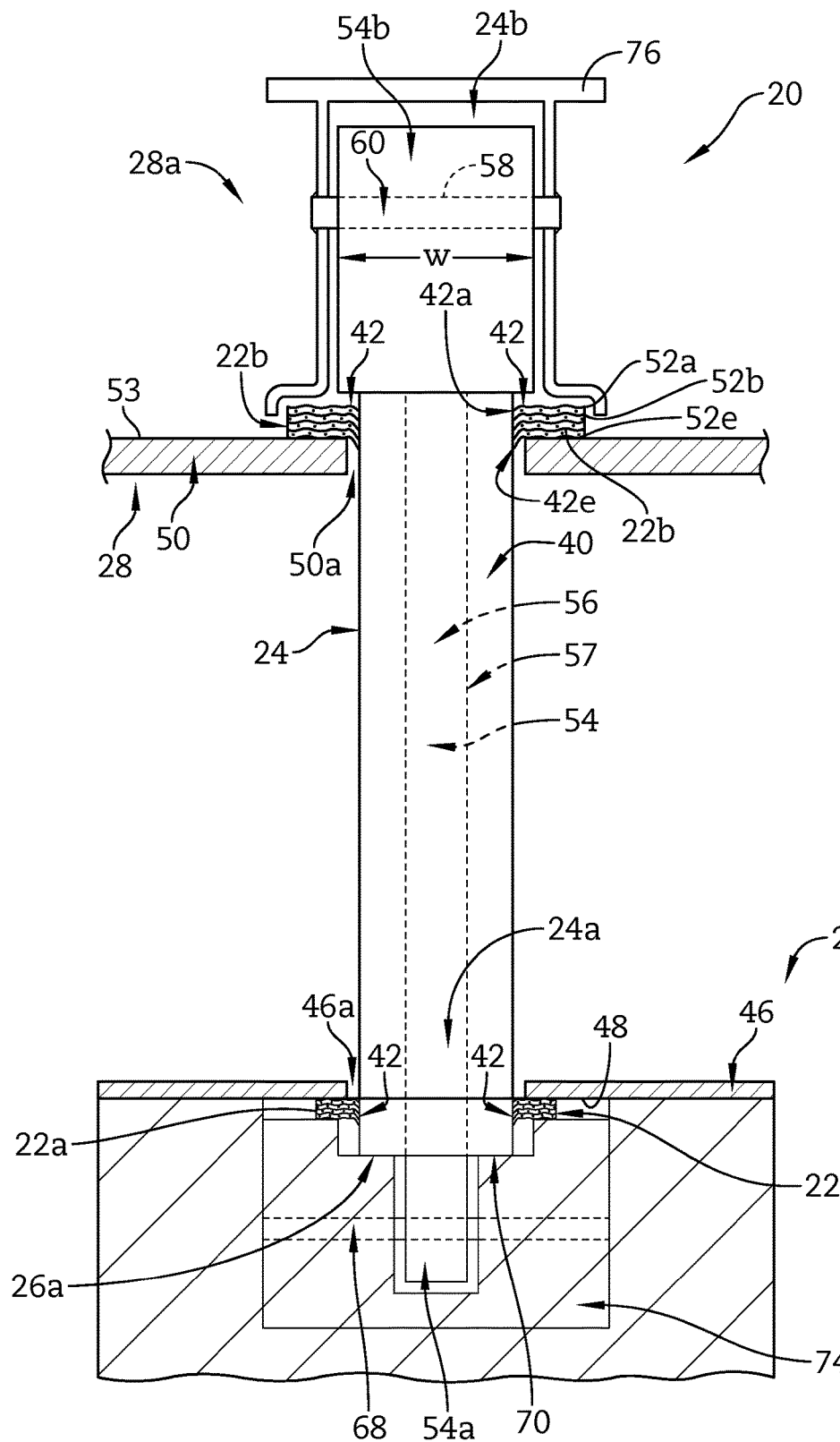
FIG. 4 is a detailed cross-sectional view of the vane assembly shown in FIG. 2 showing that an outer band defines an outer receiving space sized to receive an outer portion of the airfoil vane and that an inner band defines an inner receiving space sized to receive an inner portion of the airfoil vane, and that the airfoil vane includes an inner spar and an outer shell, and showing that an outer fabric seal receives the airfoil vane in its seal aperture such that the outer shell is in contact with the fringe of the outer fabric seal, and that an inner fabric seal receives the airfoil vane in its seal aperture such that the outer shell is in contact with the fringe of the second fabric seal.

Sheets 52a-52e are illustratively placed together in stacked arrangement and stitched to one another to form fabric seals 22a, 22b as shown in FIG. 4. Each sheet 52a, 52b, 52c, 52d, 52e includes its own innermost cross tow 38a and defines its own respective fringe section 42a, 42b, 42c, 42d, 42e which collectively define fringe 42 as shown in FIG. 4. Aperture 32 of each fabric seal 22a, 22b is illustratively defined by the collective fringe sections 42a-42e and extends through each of the stacked sheets 52a-52e.

In the illustrative embodiment, fiber tows 36, 38 of fabric seals 22a, 22b may include ceramic fibers including but not limited to oxide fibers, silicon-carbide fibers, or the like. In some embodiments, any other type of fibers suitable for sealing against leakage of combustion exhaust products in turbine engines.

Vane assembly 20, as shown in FIG. 4, illustrates the interaction between fabric seals 22a, 22b, static vane 24, and inner and outer bands 26, 28. Inner band 26 includes an inner flow path wall 46 having an opening 46a. Inner band 26 defines an inner receiving space 26a that receives an inner portion 24a of static vane 24. Static vane 24 extends through opening 46a to position its inner portion 24a within inner receiving space 26a. Inner fabric seal 22a is illustratively located within inner receiving space 26a.

Inner fabric seal 22a is illustratively disposed to contact an inner side 48 of inner flow path wall 46 of inner band 26.

Inner fabric seal 22a illustratively receives inner portion 24a of vane 24 through its aperture 32 as shown in FIG. 4. Inner fabric seal 22a illustratively contacts its fringe 42 against vane 24 within inner receiving space 28a such that the fringe 42 distorts, for example, curves in an upwardly manner, to form a brush-type seal around vane 24 as shown in FIG. 4.

Outer fabric seal 22b is illustratively disposed to contact an outer side 53 of an outer flow path wall 50 of outer band 28. outer band 28 includes the outer flow path wall 50 that includes an opening 50a. outer band 28 defines an outer receiving space 28a that receives an outer portion 24b of static vane 24. Static vane 24 illustratively extends through opening 50a to position its outer portion 24b within outer receiving space 28a. Outer fabric seal 22b is illustratively located within outer receiving space 28a.

Outer fabric seal 22b illustratively receives outer portion 24b of vane 24 through its aperture 32 as shown in FIG. 4. Outer fabric seal 22b illustratively contacts its fringe 42 against vane 24 within outer receiving space 28a such that the fringe 42 distorts, for example, curves in a downwardly manner, to form a brush-type seal around vane 24 as shown in FIG. 4. Outer fabric seal 22b is illustratively disposed to contact an outer side 53 of outer flow path wall 50 of outer band 28.

As illustratively shown in FIG. 4, static vane 24 includes an center spar 54 and an outer shell 40. Center spar 54 includes inner and outer ends 54a, 54b and spar body 56. Spar body 56 illustratively extends between inner end 54a and outer end 54b through flow path 17. Inner and outer ends 54a, 54b and spar body 56 are illustratively embodied as integrally formed but in some embodiments may be rigidly connected by any suitable manner.

Inner end 54a is positioned within inner receiving space 26a. Inner end 54a is illustratively pinned to inner band 26. Inner end 54a includes a bore 66 configured to receive a pin 68 therethrough for pinning the inner end 54a to inner band 26 within inner receiving space 28a as shown in FIG. 4.

Outer end 54b is illustratively positioned within outer receiving space 28a and is pinned to outer band 28. In the illustrative embodiment, outer end 54b includes a bore 58 configured to receive a pin 60 therethrough for pinning the outer end 54b to outer band 28 within outer receiving space 28a as shown in FIG. 4. Outer end 54b illustratively has a width w larger than each of the spar body 56 and the outer shell 40. Outer end 54b includes a radially inward facing surface 62 defined at an interface with spar body 56.

Outer shell 40 is arranged to surround spar body 56 along the entire length of spar body 56 through flow path 17 such that center spar 54 penetrates through an interior cavity 57 of outer shell 40 and protrudes from each inner and outer end of outer shell 40 as shown in FIG. 4. Outer shell 40 extends partly into each of inner and outer receiving spaces 26a, 28a. Outer shell 40 includes a radially outward facing surface 64 configured to abut inward facing surface 62 of outer end 54b. Outer shell 40 includes a radially inward facing surface 70 configured to abut a portion of inner band 26 as shown in FIG. 4. Outer shell 40 contacts fringes 42 of each of fabric seals 22a, 22b within each of the respective inner and outer receiving spaces 26a, 28a.

In the illustrative embodiment shown in FIG. 4, inner seal 22a is contacted on an inner side thereof 25 by a rigid retainer 74 of inner band 26 to which inner end 54a of center spar 54 is pinned, and against which inward facing surface 62 of outer shell 40 abuts. Outer seal 22b is contacted on an outer side 27 thereof by a rigid retainer 76 of outer band 28 to which outer end 54b of center spar 54 is pinned, and against which inward facing surface 62 of outer shell 40 abuts.

Figure 5:
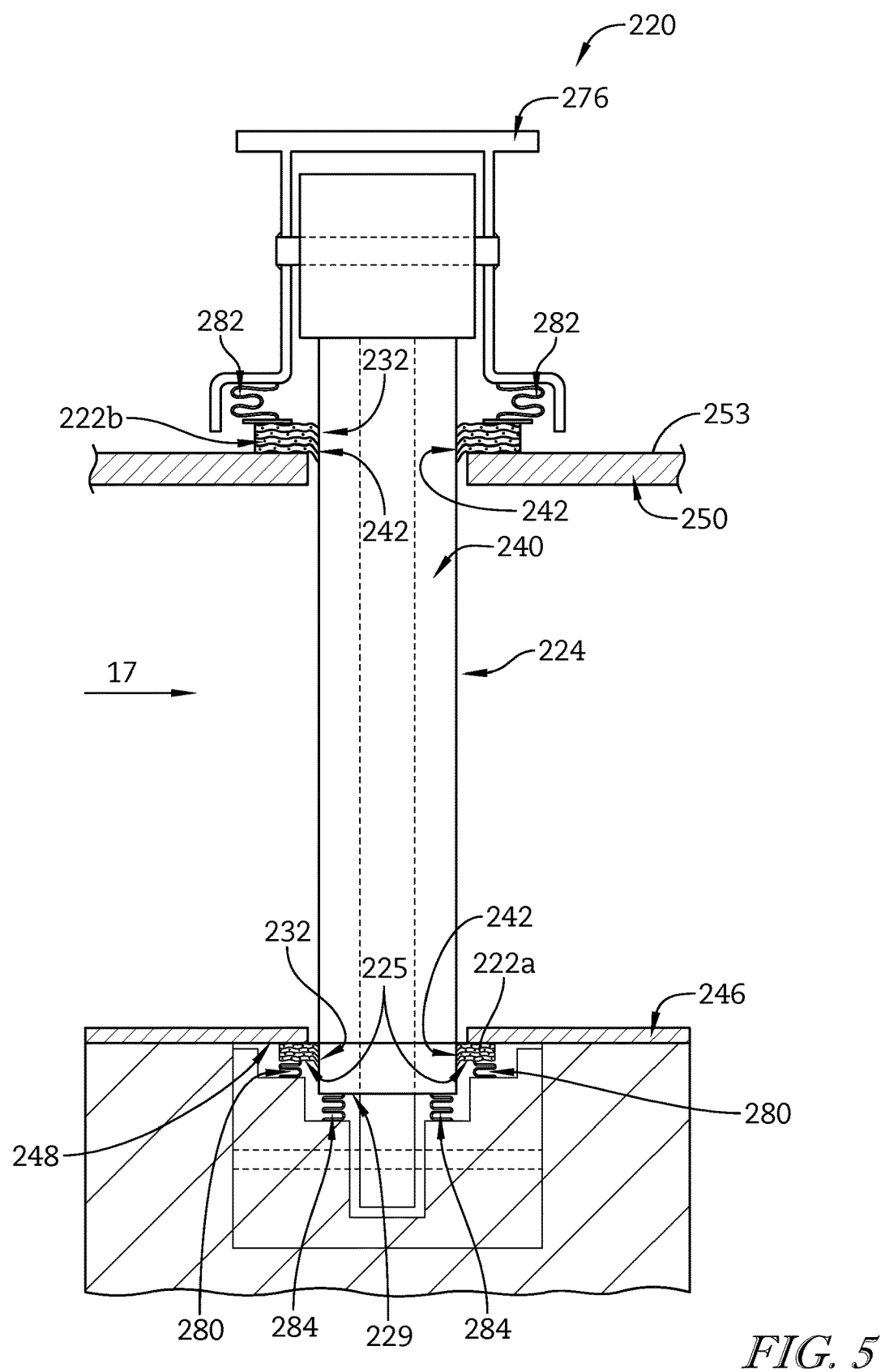
FIG. 5 is a detailed cross-section view of another vane assembly adapted for use in the turbine of FIGS. 1 and 2 showing that an outer fabric seal is contacted by a spring on its outer side, and that an inner fabric seal is contacted by a spring on its inner side.

In another illustrative embodiment as shown in FIG. 5, a fabric seal assembly 220 includes fabric seals 222a, 222b illustratively disposed between components of the turbine assembly 18 to seal combustion products from leaking between those components. Fabric seal assembly 220 is configured for use in gas turbine engine 10 and is substantially similar to the fabric seal assembly 20 shown in FIGS. 1-4 and described herein. Accordingly, similar reference numbers in the 200 series indicate features that are common between the fabric seal assembly 20 and fabric seal assembly 220 unless indicated otherwise. The description of fabric seal assembly 20 is hereby incorporated by reference to apply to fabric seal assembly 220 except in instances when it conflicts with the specific description and drawings of fabric seal assembly 220.

Fabric seals assembly 220 includes inner fabric seal 222a and outer fabric seal 222b. Fabric seals 222a, 222b each illustratively define a seal aperture 232 as shown in FIG. 5. In the illustrative embodiment, seal aperture 232 of each fabric seal 222a, 222b receives a portion of an airfoil static vane 224 therethrough.

Unlike fabric seal assembly 20, fabric seals 222a, 222b of fabric seal assembly 220 are resiliently contacted by inner and outer biasing members 280, 282 as shown in FIG. 5. Inner biasing members 280 are disposed within an inner receiving space 226a of an inner band 226. Inner biasing members 280 contact inner fabric seal 222a on an inner side 225 thereof to provide resilient biasing against an inner surface 248 of an inner flow path wall 246. Inner biasing members 280 are supported on their radially inward sides by a rigid retainer 276 of outer band 228.

Outer biasing members 282 are disposed with an outer receiving space 228a of an outer band 228. Outer biasing members 282 contact outer fabric seal 222b on an outer side 227 thereof to provide resilient biasing against an outer surface 253 of an outer flow path wall 250. Outer biasing members 282 are supported on their radially outward sides by a rigid retainer 276 of outer band 228 that is shaped to accommodate biasing members 282.

Fabric seal assembly 220 includes shell biasing members 284 as shown in FIG. 5. Shell biasing members 284 contact an inner side 229 of an outer shell 240 of an airfoil static vane 224 to provide resilient biasing thereto in a radially outward direction. Biasing members 280, 282, 284 are illustratively embodied as wave springs but in some embodiments may include leaf springs, resilient materials, gas springs and/or any other suitable biasing device.

Figure 6:
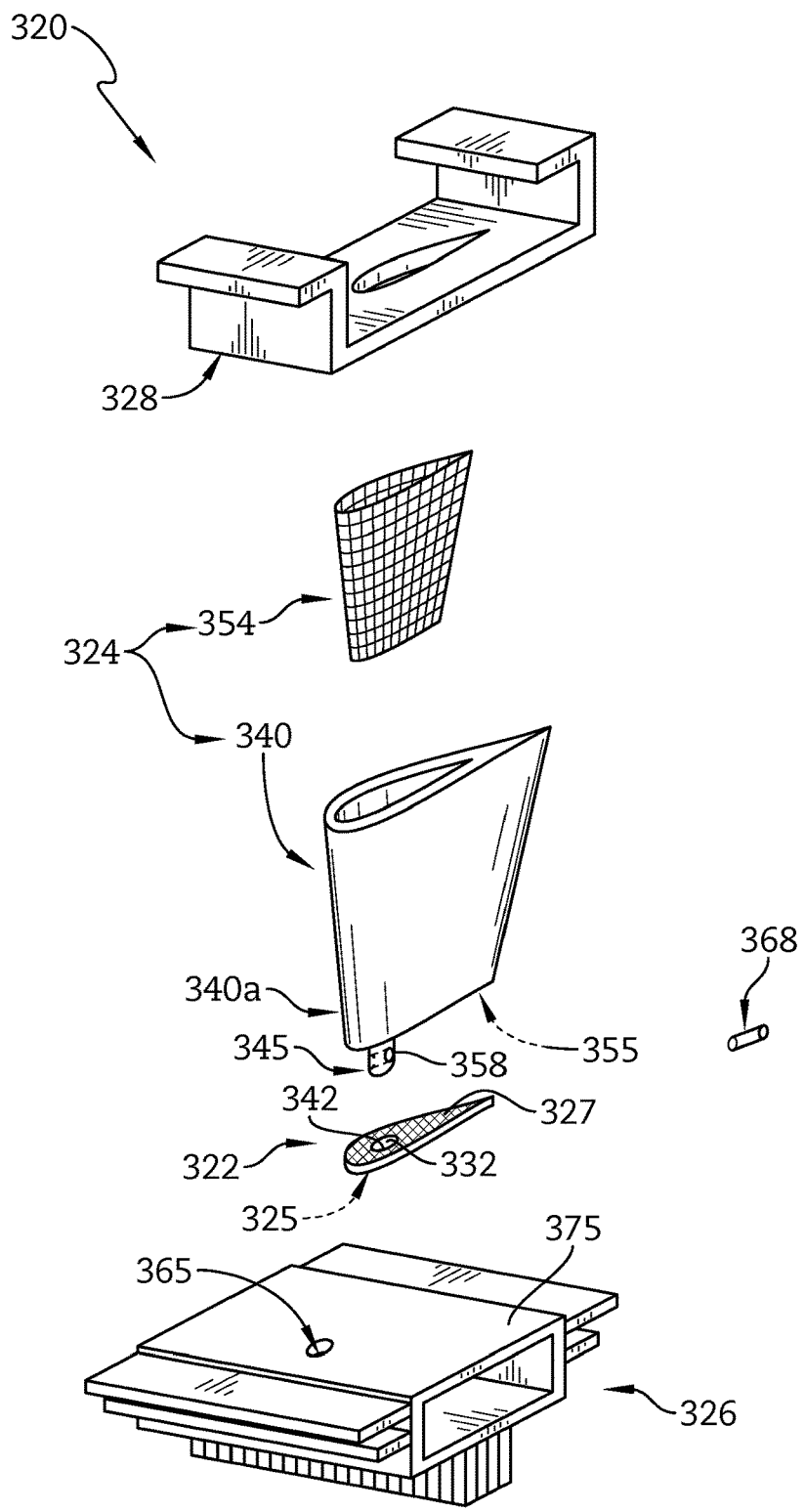
FIG. 6 is an exploded perspective view of another vane assembly adapted for use in the turbine of FIGS. 1 and 2 showing that the static airfoil vane includes a vane body formed of wire and having an outer shell disposed around the wire, and a connection protrusion extending downward from an inward face of the vane body and configured for insertion through the seal aperture and into a receiving space defined by an inner band portion of the vane assembly, and showing that the fabric seal is configured to abut the inward face of the vane body and that the fringe is configured to contact the connection protrusion.

In another illustrative embodiment as shown in FIG. 6, a fabric seal assembly 320 includes fabric seal 322 illustratively disposed between components of the turbine 18 to seal combustion products from leaking between those components. Fabric seal assembly 320 is configured for use in gas turbine engine 10 and is substantially similar to the fabric seal assemblies 20, 220 shown in FIGS. 1-5 and described herein. Accordingly, similar reference numbers in the 300 series indicate features that are common between the fabric seal assemblies 20, 220 and fabric seal assembly 320 unless indicated otherwise. The descriptions of fabric seal assemblies 20, 220 are hereby incorporated by reference to apply to fabric seal assembly 320 except in instances when it conflicts with the specific description and drawings of fabric seal assembly 320.

Fabric seal assembly 320 includes an airfoil static vane 324 comprised of an inner wire spar 354 surrounded by an outer shell 340 as shown in FIG. 6. Static vane 324 is illustratively connected to an outer band portion 328 by inner wire spar 354. Static vane 324 is connected to an inner band portion 326 by outer shell 340.

Outer shell 340 includes a radially inner end 340a and radially inward facing surface 355 as shown in FIG. 6. A connection protrusion 345 extends from inwardly facing surface 355 in a radially inward direction for connection with inner band portion 326. Connection protrusion 345 is configured for insertion within an opening 365 within inner band portion 326.

Inner band portion 326 includes an outward facing surface 375 and opening 365. Opening 365 is configured to receive connection protrusion therein to secure static vane 324 to inner band portion 326. Connection protrusion 345 is illustratively cylindrical and pinned for connection with connection protrusion 345 by a pin 368 received through a bore 358 in connection protrusion 345, but in some embodiments may have any suitable shape for connection to inner band portion 326 and may be connected to inner band portion 326 by bolted connection and/or any other suitable fastening manner.

Fabric seal 322 is configured to abut inwardly facing surface 355 of airfoil vane 324 and outwardly facing surface 375 of inner band portion 326. An inner side 325 of fabric seal 322 is configured to contact outwardly facing surface 375. An outer side 327 of fabric seal 322 is configured to contact inwardly facing surface 355. Fabric seal 322 defines a seal aperture 332 having fringe 342 defined therein by free end 336a of free tows 336 of fabric seal 322.

Similar to the fabric seal assemblies 20, 220, fabric seal 322 has a plurality of layers in stacked arrangement and defining seal aperture 332 through each layer. Unlike the seal apertures 32, 232 of fabric seal assemblies 20, 220, seal aperture 332 is configured to receive connection protrusion 345 therethrough instead of the airfoil static vane 324 itself. Fringe 342 illustratively defines a negative cylindrical shape complimentary to connection protrusion 345. In some embodiments, fringe 342 may have any shape configured to provide sealing contact with connection protrusion 345. Fringe 342 of seal aperture 332 receives and contacts connection protrusion 345 to seal against leaking of combustion products therebetween.

Figure 7:
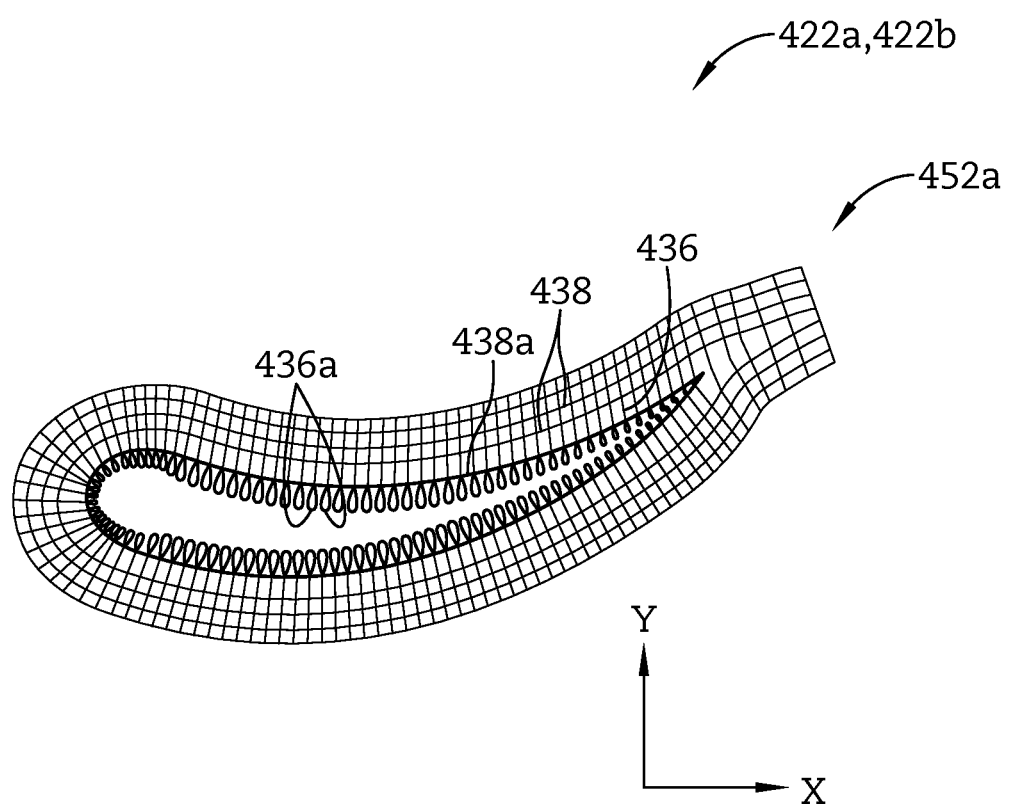
FIG. 7 is a plan view of another embodiment of the fabric seal of FIG. 3 showing that the free tows each form a loop on their free end within the seal aperture to form the fringe.

In another illustrative embodiment, fabric seals 422a, 422b are shown in FIG. 7. Fabric seals 422a, 422b are configured for use in gas turbine engine 10 and is substantially similar to the fabric seals 22a, 22b, 222a, 222b, 322 as shown in FIGS. 1-6 and described herein. Accordingly, similar reference numbers in the 400 series indicate features that are common between the fabric seals 22a, 22b, 222a, 222b, 322 and fabric seals 422a, 422b unless indicated otherwise. The descriptions of fabric seals 22a, 22b, 222a, 222b, 322 are hereby incorporated by reference to apply to fabric seals 422a, 422b except in instances when it conflicts with the specific description and drawings of fabric seals 422a, 422b.

Fabric seals 422a, 422b each include free tows 436 and cross tows 438 woven together to form a sheet 452a as shown in FIG. 7. Free tows 436 each extend towards a seal aperture 432 defined by the fabric seal 422a, 422b. Free tows 436 each have free ends 436a arranged within seal aperture 432. Seal aperture 432 is defined by innermost cross tow 438a. Free ends 436a of sheet 452a collectively define a fringe section 442a located within seal aperture 432. In the illustrative embodiment, fabric seals 422a, 442b each include a plurality of sheets 452a-452e configured in a stacked arrangement and each having fringe sections 442a-

442e that collectively define a fringe 442 with seal aperture 432 for contact with a component of the gas turbine engine for sealing against leakage of combustion exhaust products.

The present disclosure includes, among other things, description of oxide fiber fabric warp tows frayed and terminating in the space of the vane i.e., cutout in the fabric is smaller than the mating vane thus creating a tight fit. In some embodiments, loosely looped tows may be purposefully located at the interface region for improved durability. Such arrangements allow sealing of complex surfaces and over a range of component positions, accommodates geometric manufacturing tolerances and relative movement such as due to thermal growth, among other issues. Fiber materials may be selected based on one or more of temperature capability, weavability, chemical resistance, chemical interaction with adjoining materials, and other conditions specific factors.

In some embodiments, a compliant fabric and or brush seal for reducing unwater gas flow between components in hot environments, such as gas turbine engines. In some embodiments, a fabric seal is captured between two adjacent parts, such as a CMC vane and an outer endwall of unspecified material. Compression of the fabric may be achieved through an assembly pre-load and or through operational loads. The seal is illustratively comprised of a multitude of layers and segments and may be stitched together. The seal is assembly such that a fringe of fiber tows is created within the part space for the CMC vane. Upon assembly, the fringe may create a brush seal around the vane perimeter. In some embodiments, the vane may include a hollow CMC outer vane shell with a metal spar. The bursh seals may restrict gas flow migration at the joints formed between the vanes and the flow path endwalls.

In some embodiments, the seals prevent leakage through gaps formed between adjoining components. Such seals may have many possible applications in a turbine engine including but not limited to sealing of the joints between a vane and an endwall, between mating blade tracks, between blade tracks and support structures, and between a combustion liner and the supporting structure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fabric seal for sealing between components of a gas turbine engine, the fabric seal comprising
 a number of free tows each having a length and extending to a free end, and
 a number of cross tows each extending across the length of the free tows and woven together therewith,
 wherein the fabric seal defines a seal aperture, and the free ends of the free tows terminate within the seal aperture to provide a fringe and are configured for compliant contact with a component of a gas turbine engine inserted into the seal aperture to provide fluid sealing around the component.

2. The fabric seal of claim 1, wherein the fringe defines a negative airfoil shape.

3. The fabric seal of claim 2, wherein the cross tows extend along the profile of the negative airfoil shape and the free tows extend inwardly towards the aperture.

4. The fabric seal of claim 1, wherein the fabric seal comprises ceramic fibers.

5. The fabric seal of claim 1, wherein a plurality of the free tows and a plurality of the cross tows are woven together into a first sheet, and another plurality of the free tows and another plurality of the cross tows are woven together into a second sheet, and the first and second sheets are configured in a stacked arrangement.

6. The fabric seal of claim 5, wherein the seal aperture is defined through each of the first and second sheets.

7. The fabric seal of claim 1, wherein each free end of the free tows defines a loop within the aperture.

8. An assembly adapted for use in a gas turbine engine the assembly comprising
 a first component defining a receiving space,
 a second component comprising ceramic matrix materials and arranged to extend into the receiving space, and
 a fabric seal defining a seal aperture and having tows that extend into the seal aperture, the tows each including a free end,
 wherein the second component is arranged to extend through the seal aperture and contacts the free ends of the tows of the fabric seal to seal against fluid passing between the first and second components.

9. The assembly of claim 8, wherein the second component is an airfoil vane of the gas turbine engine.

10. The assembly of claim 9, wherein a fringe defines a negative airfoil shape smaller than a cross-section of the airfoil vane.

11. The assembly of claim 10, wherein the first component is an inner band of the gas turbine engine and the receiving space is configured to receive the airfoil vane for connection to the inner band.

12. The assembly of claim 11, wherein the airfoil vane includes a vane body for contacting combustion exhaust gases and a connection protrusion that extends into the receiving space of the first component, the vane body having a radially inward face.

13. The assembly of claim 12, wherein the fabric seal abuts the radially inward face of the vane body and the fringe of the fabric seal contacts an outer surface of the connection protrusion.

14. The assembly of claim 11, wherein the airfoil vane includes an inner spar and an outer shell disposed on the inner spar for contacting combustion exhaust gases, and a radially inward end of the airfoil vane including a portion of both the inner spar and the outer shell is inserted into the receiving space, and the fringe of the fabric seal is disposed in contact with the portion of the outer shell inserted into the receiving space.

15. The assembly of claim 9, wherein the first turbine component is an outer band including a receptacle configured to receive the airfoil vane.

16. The assembly of claim 15, wherein the airfoil vane includes an inner spar and an outer shell disposed on the inner spar for contacting combustion exhaust gases, and a radially outward end of the airfoil vane including a portion of both the inner spar and the outer shell is inserted into the receptacle, and a fringe of the fabric seal is disposed in contact with the portion of the outer shell inserted into the receptacle, and the outer fabric seal contacts a biasing member to provide resilient biasing of the fabric seal.

17. The assembly of claim 8, wherein tows of the fabric seal are free tows and the fabric seal includes cross tows, and a plurality of the free tows and a plurality of the cross tows are woven together into a first sheet, and another plurality of the free tows and another plurality of the cross tows woven together into a second sheet, and the first and second sheets are arranged in a stacked arrangement and the seal aperture is defined through each of the first and second sheets.

18. The assembly of claim 8, wherein each free end of the tows defines a loop.

19. A method of sealing components of a gas turbine engine, the method comprising positioning a fabric seal including a number of tows each having free ends arranged within a seal aperture defined by the fabric seal such that the fabric seal is in contact with a first component of the gas turbine engine, positioning a second component of the gas turbine component in contact with the free ends of the fabric seal, and driving the second component through the seal aperture into an operable position such that the free end of at least one of the tows of the fabric seal is distorted to maintain contact with the second component to provide fluid sealing.

20. The method of claim 19, wherein the second turbine component is an airfoil vane of the gas turbine engine.

* * * * *